United States Patent
Erb, Jr.

(10) Patent No.: US 6,579,396 B2
(45) Date of Patent: Jun. 17, 2003

(54) METHODS OF MANUFACTURING HIGH PERFORMANCE INSULATIONS

(75) Inventor: David F. Erb, Jr., Readfield, ME (US)

(73) Assignee: Tex Tech Industries, Inc., North Monmouth, ME (US)

( * ) Notice: Subject to any disclaimer, the term of this patent is extended or adjusted under 35 U.S.C. 154(b) by 0 days.

(21) Appl. No.: 10/092,582

(22) Filed: Mar. 8, 2002

(65) Prior Publication Data

US 2002/0134484 A1 Sep. 26, 2002

Related U.S. Application Data

(62) Division of application No. 09/369,557, filed on Aug. 6, 1999, now Pat. No. 6,383,623.

(51) Int. Cl.$^7$ .............................. B32B 5/08; B32B 5/06
(52) U.S. Cl. ......................... 156/166; 28/103; 28/107; 28/112; 156/148; 156/296; 156/311; 427/373; 427/407.1; 427/412; 427/532; 428/297.4; 428/299.7; 428/300.4
(58) Field of Search ................................ 156/148, 166, 156/296, 311; 427/373, 407.1, 412, 532; 28/103, 107, 112; 428/297.4, 299.7, 300.4

(56) References Cited

U.S. PATENT DOCUMENTS

| | | |
|---|---|---|
| 3,117,359 A | 1/1964 | O'Byrne |
| 3,307,238 A | 3/1967 | Foster |
| 3,464,097 A | 9/1969 | Zocher |
| 3,641,636 A | 2/1972 | Foster |
| 3,686,048 A | 8/1972 | Schirtzinger |
| 3,762,004 A | 10/1973 | Shepard et al. |
| 3,844,004 A | 10/1974 | Foster |
| 3,983,273 A | 9/1976 | Elliott |
| 4,129,675 A | 12/1978 | Scott |
| 4,195,112 A | 3/1980 | Sheard et al. |
| 4,309,800 A | 1/1982 | Foster |
| 4,502,364 A | 3/1985 | Zucker et al. |
| 4,522,876 A | 6/1985 | Hiers |
| 4,726,987 A | 2/1988 | Trask et al. |
| 4,732,809 A | 3/1988 | Harris, Jr. et al. |
| 4,780,359 A | 10/1988 | Trask et al. |
| 4,840,838 A | 6/1989 | Wyss |
| RE33,023 E | 8/1989 | Hiers |
| 4,897,303 A | 1/1990 | Trask et al. |
| 4,948,649 A | 8/1990 | Hiers et al. |
| 5,049,435 A | 9/1991 | Uno et al. |
| 5,096,526 A | 3/1992 | Engwall |
| 5,160,485 A | 11/1992 | Jaillet et al. |
| 5,194,322 A | 3/1993 | Doran |
| 5,199,141 A | 4/1993 | Trask et al. |
| 5,316,834 A | 5/1994 | Matsuda et al. |
| 5,372,885 A | 12/1994 | Tabor et al. |
| 5,393,601 A | 2/1995 | Heinrich et al. |
| 5,433,998 A | 7/1995 | Curzio et al. |
| 5,529,826 A | 6/1996 | Tailor et al. |
| 5,578,368 A | 11/1996 | Forsten et al. |
| 5,607,531 A | 3/1997 | Needham et al. |
| 5,633,075 A | 5/1997 | Park et al. |
| 5,662,728 A | 9/1997 | Groeger |
| 5,698,324 A | 12/1997 | Jung et al. |
| 5,721,177 A | 2/1998 | Frank |
| 5,753,001 A | 5/1998 | Greatorex |
| 5,851,326 A | 12/1998 | Custer et al. |
| 5,859,099 A | 1/1999 | Kasowski |

Primary Examiner—Elizabeth M. Cole
Assistant Examiner—Ula C. Ruddock
(74) Attorney, Agent, or Firm—Fitzpatrick, Cella, Harper & Scinto

(57) ABSTRACT

A durable, low-density, high performance insulating material is suitable for use as a high temperature thermal and acoustic insulation. The insulation includes fiber batting made with non-thermoplastic fibers or blends of fibers such as aramid fibers and ceramic fibers, which are bound within at least some interstices by high temperature non-flammable thermoplastic binder such as polyphenylene sulfide. In addition, a fireblocking layer can be provided on at least one surface of the insulation to further improve fire ablation or flame retardance.

11 Claims, 7 Drawing Sheets

METHODS OF MANUFACTURING HIGH PERFORMANCE INSULATIONS

This application is a divisional of application Ser. No. 09/369,557, filed Aug. 6, 1999, now U.S. Pat. No. 6,383,623.

BACKGROUND OF THE INVENTION

1. Field of the Invention

This invention pertains to high performance materials having superior thermal and/or acoustic insulative properties. More particularly, this invention relates to low-density thermal and acoustic insulation which can withstand elevated temperatures while retaining its insulative properties. In addition, this invention concerns insulation material suitable for use in aviation. Other aspects of the invention involve methods for manufacturing such insulation.

A modern airplane has a layer of insulation located just inside the plane's exterior skin for the purpose of limiting the flow of heat into and out of the plane's cabin. Since the temperature at the cruising altitude of commercial jets may be −30°, while the temperature in the cabin is approximately 70°, the resulting 100° temperature gradient would, unless thermal insulation is used, lead to a significant loss of heat from the cabin.

Insulation also serves to reduce the noise level in the cabin, such noise being produced both by the plane's engine (s) and the plane's motion through the air.

Typically, the insulation used in planes is composed of singular or multiple layers of finely spun fiberglass blankets of various densities designed for thermal and acoustic protection, the latter against both high frequency sounds from jet engine noise as well as structural-borne lower frequency sounds. This material is very fine in fiber diameter and tends to fracture easily.

Conventional aircraft insulation has a number of shortcomings. As highlighted by several recent incidents involving the suspected failure of aircraft insulation, the most problematic of these shortcomings is the material's performance in fires. At elevated temperatures, which may typically approach 2000° F., conventional aircraft interior materials, including insulation, because of the materials from which it is made, begins emitting substantial quantities of thick, toxic smoke. Carbon monoxide and hydrogen cyanide are the two principal toxic combustion gases. Most cabin furnishings contain carbon and will generate both carbon monoxide and carbon dioxide when burned. Burning wool, silk and many nitrogen-containing synthetics will produce the more toxic hydrogen cyanide gas. Irritant gases such as hydrogen chloride and acrolein, are generated from burning wire insulation and some other cabin materials. Generally, carbon dioxide levels increase and oxygen concentrations decrease during fires. Although fire is a great danger, it has been determined that the toxic smoke produced by the smoldering insulation and interior materials is a grave threat in its own right. The blinding smoke will interfere with the evacuating passengers' finding the plane's emergency exits, and because it is toxic, it may asphyxiate passengers who do not escape quickly. More people could be killed through asphyxiation by toxic smoke than might die in the fire itself.

Recent incidents involving the suspected failure of aircraft insulation confirm the need for safer, more thermally-stable insulation. In October of 1998, the Federal Aviation Administration (FAA), responding to the crash of a Swissair flight near Halifax, Nova Scotia, a month earlier, recommended the replacement of the insulation in nearly all of the world's 12,000 passenger jet planes. The FAA has also warned that the Mylar insulation used in passenger planes can catch fire when exposed to electrical shorts, and so the FAA has established new flammability standards for airplane insulation that require materials to withstand higher temperatures for extended periods of time.

One approach to improving aircraft insulation's performance is to provide the insulation with a protective outer layer. The FAA has investigated "hardening" aircraft fuselages to increase the time it takes flames outside an aircraft to burn through the plane's fuselage. One "hardening" technique under investigation involves using heat-stabilized, oxidized polyacrylonitrile fiber (PAN), which may double the time it takes flames to penetrate into the plane's cabin. Barrier materials, such as those utilizing PAN, are composed of a random fiber mat or felt used in conjunction with existing fiberglass systems for improved fuselage burn-through times.

Incidentally, this "hardening" approach is similar to that described in U.S. Pat. No. 5,578,368. The '368 patent describes a material for use in sleeping bags having a protective outer layer made from aramid fiber, and the patent says this aramid layer imparts fire-resistance.

Accordingly, there is a real need for aircraft insulation which is able to sustain high temperatures without burning, smoking, degrading or outgassing. It is also desirable that when such insulation finally burns, it does so in a self-extinguishing manner.

"Low-performance" insulation commonly used in building construction for wall and ceiling barriers, as well as pipe wrappings, and even in aerospace applications such as aircraft thermal blankets, is typically made from a light-weight batting of glass fibers held together by a thermoset phenolic resin binder. This insulation material, commonly referred to as "fiberglass insulation", is inexpensive and may be suitable as a low temperature thermal insulator and sound absorbing material. Such insulation has a number of serious shortcomings.

For example, fiberglass insulation is brittle in nature, meaning that when it is handled, airborne glass particles are produced. Those working with the fiberglass insulation may inhale the airborne glass particles, irritating their lungs. Glass particles may lodge in the workers' skin, also causing irritation. Although those handling the fiberglass insulation can protect themselves by using respiratory masks and wearing protective gear, that results in added expense and inconvenience.

Another shortcoming of fiberglass insulation is that the material is hydrophilic, meaning water can permeate into and be absorbed by the insulation. The absorbed water decreases the insulation's thermal and acoustic properties, and also increases the insulation's weight, which is a serious problem if the insulation is used in aviation. Since airplane insulation is mounted against the plane's skin, the insulation becomes quite cold when the plane is in flight. When warm, moist air, such as the air in the cabin, passes over the insulation, the water in that air condenses on and collects in the cold insulation. Over time, the insulation may become soggy, reducing its insulating abilities, and heavy, increasing the plane's operating costs. While it may be possible to reduce water absorption by treating the fiberglass insulation or providing a barrier layer, this complicates the manufacturing process and makes the insulation more expensive.

Accordingly, there is a need for alternative insulative materials which have superior thermal and acoustic properties, without the inherent disadvantages of conventional insulation.

2. Description of the Related Art

It is generally known to provide composite materials, typically, textiles or filtration members, in which non-thermoplastic materials, for example, aramid fibers, are combined with thermoplastic materials, for example, polyphenylene fibers. A variety of such composite materials are discussed in U.S. Pat. Nos. 4,502,364, 4,840,838, 5,049,435, 5,160,485, 5,194,322, 5,316,834, 5,433,998, 5,529,826, and 5,753,001.

Blending of non-thermoplastic fibers with thermoplastic fibers to form consolidated composite materials is discussed in U.S. Pat. Nos. 4,195,112 and 4,780,59. The structures described in these patents are meant to serve as high density composite materials, and are intended to be used as load bearing and structural panels or as shape retaining moldable forms. It is important in considering these compositions to note that the disclosed structures are quite dense and fully consolidated, with nearly fiber-to-fiber contact and high shear loading. These structures have nearly saturated fiber to resin matrix interfaces, contributing to the high strength of these materials.

The binding of fiber blends may employ the use of low temperature sheath core technology. Such binder fibers are known as bicomponent fibers. Bicomponent fiber technology is discussed in U.S. Pat. Nos. 4,732,809 and 5,372,885. Bicomponent staple fibers have a low melting temperature sheath surrounding a higher melting temperature core, and are designed to sinter adjacent fibers upon softening, as disclosed in U.S. Pat. Nos. 4,129,675 and 5,607,531. The '531 patent notes that the materials to be coated include aramid or polyphenylene sulfide fibers, and that coating materials which can be applied include polyphenylene sulfide.

Binding of fibers may also be accomplished using powder or pellets dispersed into a fibrous web to bind adjacent fibers. Powders may be applied through the use of carrier emulsions as well as spray or static charges to adhere the powder to the matrix fibers. Processing materials to achieve an even distribution of thermoplastic powder within the web is difficult and does not permit sufficient consolidation of melted material around adjacent fibers to serve as a structural node or junction. The use of powders as a binder in fibrous webs is discussed in U.S. Pat. Nos. 4,745,024 and 5,006,483.

SUMMARY OF THE INVENTION

Having recognized the need for high-performance insulation, the inventor has conducted a detailed investigation into the fabrication of insulation components, and insulation constructions which provide improved fuselage burnthrough performance.

Based upon this investigation, materials have been developed which offer superior thermal and acoustic performance that matches the current material's light weight, yet does not shed airborne fibrous particles like fiberglass insulation. Furthermore, such material is inherently fire retardant, and the thermal and acoustic properties of the material can be tailored to specific applications by varying the diameter and density of the fibers used therein.

More specifically, the present invention employs high-performance component materials which are, because of their fire retardancy and low toxicity, particularly suited for use in aerospace insulation applications. The combination of such high performance materials in the current invention has produced insulation possessing unexpected thermal acoustic and physical properties not available in conventional insulating materials.

In addition to being well-suited for aerospace applications, this invention can also be used as fire retardant building insulation, high temperature insulation for pipe wrapping, fireman's turnout gear, padding material, high temperature gasketing or filter media.

In contrast to known bicomponent binder fibers, powder binders and composite materials, the present invention relies on melting of a thermoplastic material to encapsulate adjacent non-thermoplastic fibers. The encapsulated fibers create strong structural junctions responsible for the materials' exceptional resiliency. Also the functional maximum temperature of known bicomponent fibers does not extend to the high temperatures at which the present invention can be used.

It is accordingly an object of the present invention to provide a material that is well-suited for advanced aerospace and high temperature insulating applications, especially for use in thermal and acoustic blankets for commercial aircraft.

A further object of the present invention is to provide an insulating material incorporating a fireblocking materials within the body or as an ablative layer which addresses the FAA's desire for the development of improved fuselage burnthrough materials for commercial aircraft.

A further object of this invention is to provide an insulating material having a mass of fibers, which fibers include a non-thermoplastic material; and nodes of thermoplastic material. The nodes at least partially surround and link portions of at least some of the adjoining fibers.

Another aspect of this invention concerns a method of manufacturing insulating material. This is accomplished by providing fibers of non-thermoplastic material, providing a thermoplastic material, and mixing the non-thermoplastic and thermoplastic materials together to obtain a fiber mix. The fiber mix is heated so that at least some of the thermoplastic material melts and forms globules which at least partially enclose portions of the non-thermoplastic fibers, and then the fiber mix is cooled so that the melted thermoplastic material globules form nodes that hold the non-thermoplastic fibers together.

DESCRIPTION OF THE PREFERRED EMBODIMENTS

The present invention provides high-performance fibrous insulation materials that can survive exposure to high temperatures. Such materials are resilient even under repeated application of line and point loadings. Such high-performance insulation possesses thermal and acoustic insulative properties superior to conventional insulating materials.

Figure 2:
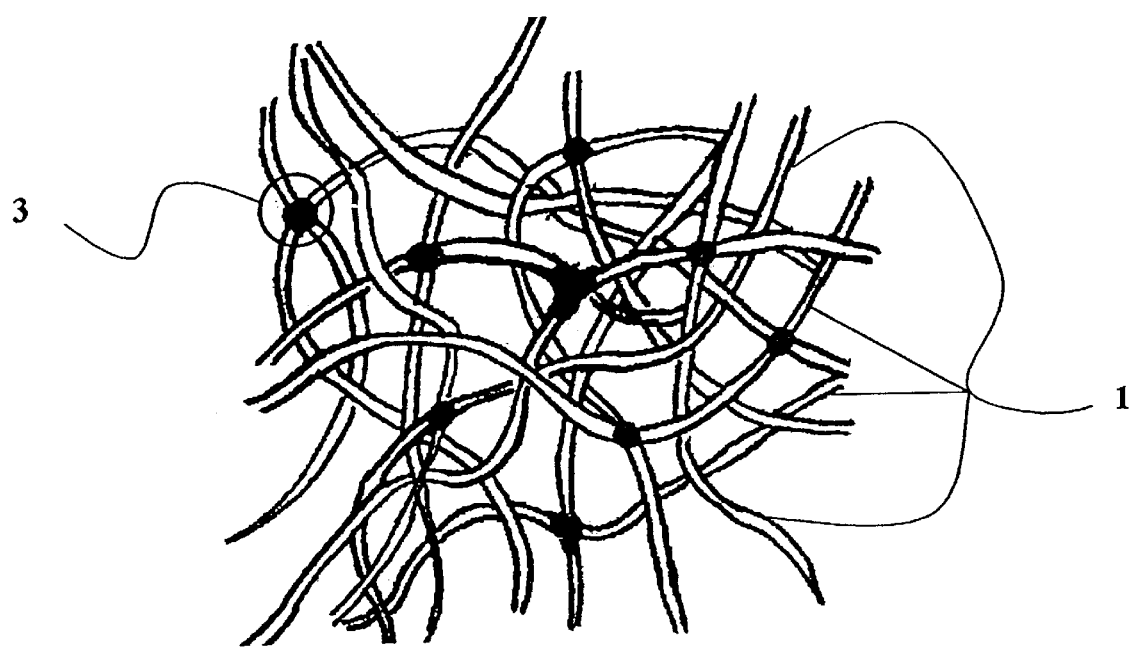
FIG. 2 depicts the homogenous blend of fibers from FIG. 1 following heating.

The inventor has discovered that high-performance insulation can be obtained by processing a mass of fibers that includes fibers of non-thermoplastic material so that points where fibers touch or at least approach one another (hereafter called "contact points") are at least partially enclosed by a binder material. As shown in FIG. 2, the binder material which encloses the contact points of the non-thermoplastic fibers 1 forms a node of material 3 at each such contact point. The node of material is, as will be discussed in greater detail hereafter, preferably made of thermoplastic material having a high melting temperature.

Insulation materials in accordance with this invention can be manufactured as follows.

Batting having a blend of non-thermoplastic fibers and thermoplastic material (fibers or otherwise) is provided. Suitable non-thermoplastic fibers include meta-aramid, para-aramid, melamine, PAN, polyimide, polybenzimidazole and polyphenylenebenzobizoxazole. Suitable thermoplastic fibers include aromatic polyketones (PEEK, PEKK), liquid crystal polymers, polyphenylene sulfide (sulfar), and thermoplastic polyimides (PAI and PEI). The batting, containing both the non-thermoplastic fibers and the thermoplastic material, is heated to at least the melting point of the thermoplastic component such that while liquid, the thermoplastic material coalesces to form globules at least in part at the contact points of the non-thermoplastic fibers. If high-performance thermoplastic materials are used, the minimum temperature to which the batting should be heated is approximately 538° F., which is roughly the minimum temperature at which such high-performance materials melt. The non-thermoplastic fibers do not liquify because they oxidize, rather than melt, at a temperature well above that to which the batting is heated. The batting is then allowed to cool, and the thermoplastic material solidifies.

It will be appreciated that the degree to which the contact points of the non-thermoplastic fibers are encased in nodes (the cooled globules) of thermoplastic material can be varied, as discussed in detail below. This is important because the degree to which the contact points are encased in thermoplastic material may affect the insulation material's properties, meaning that the degree to which the contact points are encased in thermoplastic material can be controlled so that the insulation material has preferred physical, thermal or acoustic properties. As previously noted, the degree of encasement by the thermoplastic material can be controlled according to the amount of thermoplastic material present in the blend. To increase the amount of thermoplastic material, either a greater amount of a given diameter fiber could be provided, or fiber of a larger diameter could be used. In addition, the temperature to which the blend is heated, and the time that it is held above the thermoplastic material's melting point, can be controlled to regulate the degree of encasement. The greater the opportunity the thermoplastic material has to melt and coalesce, the more of it will collect at the contact points of the non-thermoplastic material. Thus, holding the blend at a high temperature for a substantial period of time should result in insulation with more nodes than material formed by holding the blend at a lower temperature for less time.

Achieving sufficient temperature to melt the thermoplastic binder fibers may be accomplished using any number of methods for heating a fibrous web, including radiant heat, a conventional oven, steam or microwaves.

Figure 7:
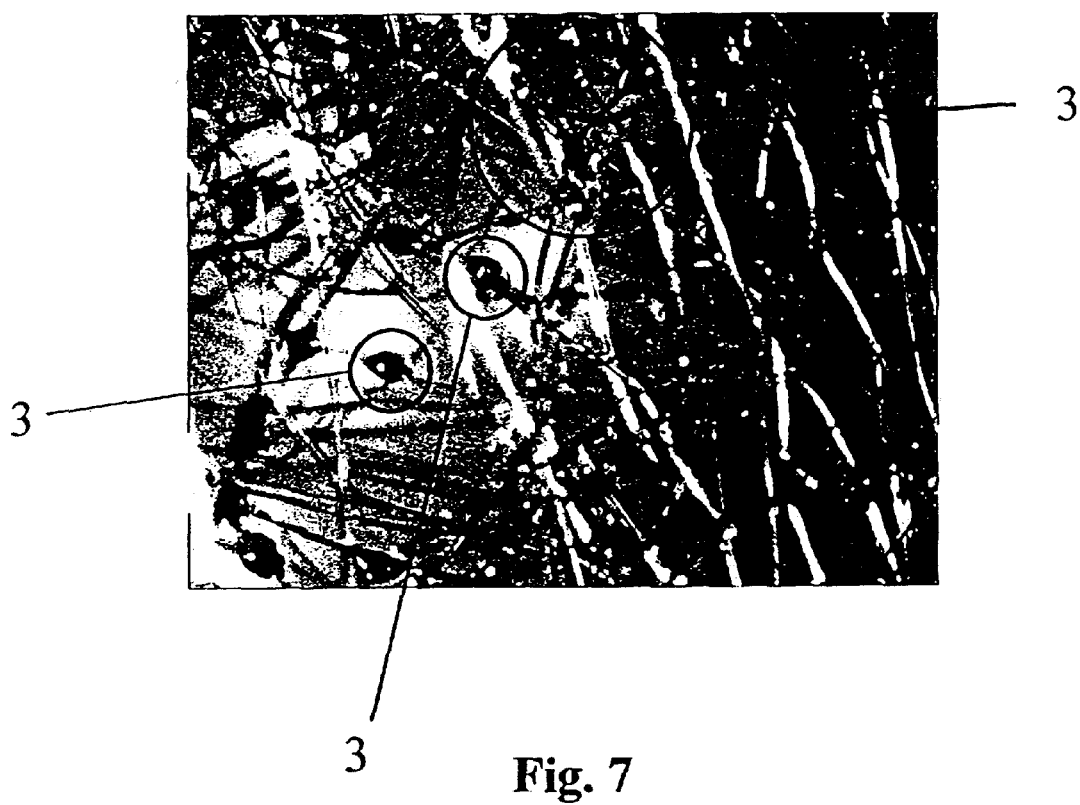
FIG. 7 is a photograph, taken through an optical microscope, of insulation according to the present invention.

FIG. 7 is a photograph of a sample of insulation prepared in accordance with this invention. In a fashion similar to that shown in FIG. 2, m-aramid fibers 1 are held to one another by nodes of thermoplastic material 3.

It is important to note that the thermoplastic material does not merely soften, but it actually melts. The liquified thermoplastic material, presumably under the influence of surface tension, collects and when cooled forms nodes where the non-thermoplastic fibers come together.

Figure 1:
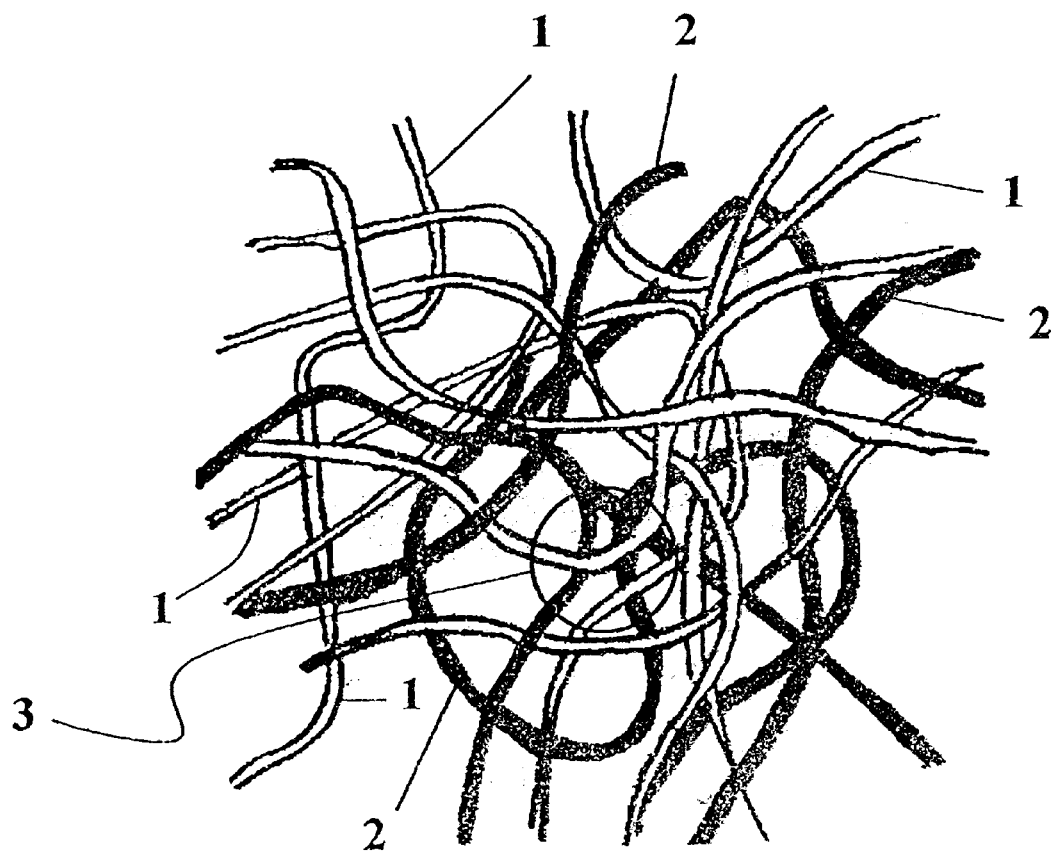
FIG. 1 shows an unheated homogeneous blend of m-aramid and polyphenylene sulfide fibers which are then processed in accordance with the present invention.

A further general example of insulation according to this invention can be made as follows, with reference being made to FIG. 1. Batting containing an intimate blend of between approximately 60–90% meta-aramid fibers (m-aramid) 1 and between approximately 10–40% polyphenylene sulfide (PPS) 2 is provided. The fibers contained in the batting are such that the fiber forming substance of the meta-aramid fibers is a long chain synthetic polyimide of which at least 85% of the amide linkages are attached directly to two aromatic rings. The polyphenylene sulfide fibers are a long chain synthetic polysulfide that has at least 85% of the sulfide linkages attached to two aromatic rings. It should be noted that the fibrous components in FIG. 1 are blended and entangled at entangled areas 3.

The batting containing the m-aramid and PPS fibers is heated to at least the melting point of the thermoplastic component so that, while in the hot liquid phase, the PPS fibers melt and collect at the crossing points within the interstices of the non-melted m-aramid fibers. The batting is thereafter cooled. An example of the batting so treated is shown in FIG. 2. Here, a lattice structure created through melting of the thermoplastic binder fibers 2 first seen in FIG. 1 can be seen. It is particularly interesting to note that the thermoplastic PPS fibers 1 first seen in FIG. 1 are consolidated around adjacent m-aramid fibers 2, resulting in an interconnected structural network of bound m-aramid fibers 3. It should be understood that the particular temperature to which the blend is heated should be chosen in consideration of the materials used in the blend. In the case where m-aramid and PPS fibers are employed, the blend could be heated to within a range exceeding 538° F. but not exceeding 575° F. Soaking time at that temperature will depend on the thickness of the material, although generally 10 minutes of soaking time for each inch of thickness is sufficient to completely melt thermoplastic binder fibers.

This heat treatment results in a strengthened and supported low density lattice structure of m-aramid fibers and PPS resin. The melted and subsequently solidified PPS resin acts as a binder, creating an extremely resilient, low-density material having high thermal resistant properties. The low-density, high-loft m-aramid/PPS material also has considerable promise for use as acoustic material, and so can serve as an absorber, damper or isolator.

Insulation prepared according to this invention can have a density between approximately 0.1–3.0 lbs/ft$^3$, and more preferably, approximately 0.5–0.6 lbs/ft$^3$.

This invention also contemplates the use of different diameter fibers to obtain insulation having particular acoustic and/or thermal insulating properties. For example, insulation could be fabricated with more than one fibrous layer, and at least some of those layers could have different densities. Different layers also might contain different diameter non-thermoplastic fibers. Such differences in layer densities and fiber diameters will have an influence on the acoustic and thermal properties of the material.

It should be kept in mind that the insulation's ability to withstand high-temperature service, along with other properties such as flammability, will be affected by the materials which make up both the non-thermoplastic and thermoplastic fibers. If the insulation is to be used at extremely high flame temperatures (>2000° F.), highly fire-retardant materials are preferred. A wide variety of known high temperature materials could be used in combination with the fire retardant fibers that comprise the insulation (fire retardant fibers comprising the insulation may include meta-aramid, para-aramid, melamine, PAN, polyimide, polybenzimidazole and polyphenylenebenzobizoxazole) to block or protect these fibers which oxidize at lower temperatures. Such materials include ceramics, intumescent foams, foils, dense layers of polyacrylonitrile fibers (PAN) or polymer films. Likewise, materials which could be used as the thermoplastic fibers include polyphenylene sulfide (Sulfar), aromatic polyketones (PEEK, PEKK), liquid crystal polymers and thermoplastic polyimides (PAI and PEI).

It also will be appreciated that the non-thermoplastic fibers could be either a single material or a mixture of different materials. So too, the thermoplastic material could be a blend of different substances. For example, the blending of two different thermoplastic fibers may be used to impart desired physical properties whereby each thermoplastic may be resistant to certain chemicals, thus giving the finished material a better overall resistance to a wider variety of chemicals.

Examples of different insulation compositions proposed in accordance with this invention will now be discussed.

EXAMPLE 1

An intimate blend of 20% 0.9 denier 1.5" staple length PPS fibers and 80% 2.0 denier 3.0" staple length m-aramid fibers is formed into a thick lofty batting.

EXAMPLE 2

An intimate blend of 20% 0.9 denier 1.5" staple length PPS fibers and 80% 2.0 denier 3.0" staple length p-aramid fibers is formed into a thick lofty batting.

EXAMPLE 3

An intimate blend of 20% 1.2 denier 2.0" staple length PPS fibers and 80% 2.0 denier 3.0" staple length melamine fibers is formed into a thick lofty batting.

EXAMPLE 4

An intimate blend of 20% 1.5 denier 2.0" staple length polyetheretherketone (PEEK) fibers and 80% 2.0 denier 3.0" staple length m-aramid fibers is formed into a thick lofty batting.

EXAMPLE 5

An intimate blend of 20% 1.2 denier 2.0" staple length PPS fibers and 40% 2.0 denier 3.0" staple length melamine fibers and 40% 2.0 denier 3.0" staple length m-aramid fibers is formed into a thick lofty batting.

EXAMPLE 6

An intimate bled of 25% 1.2 denier 2.0" staple length PPS fibers and 80% 2.0 denier 3.0" staple length m-aramid fibers formed into a thick lofty batting with a fire blocking layer comprised of polyacrylonitrile (PAN), ceramic, foil or polymer film, physically attached to at least one side of the outer surface.

Examples 1–4 were actually prepared, but were not tested. Example 5 is a conceptual example that was not prepared. Example 6 was prepared and tested.

The following insulation was prepared and found to have particularly desirable properties.

EXAMPLE 7

An intimate blend of 20% 1.2 denier 1.5" staple length PPS fibers and 80% 2.0 denier 3.0" staple length m-aramid fibers was formed into a thick lofty batting.

EXAMPLE 8

An intimate blend of 20% 1.2 denier 2.0" staple length PPS fibers and 40% 2.0 denier 3.0" staple length m-aramid fibers and 40% 2.0 denier 3.0" staple length PAN fibers was formed into a thick lofty batting.

Material produced in accordance with Example 8, described above, was tested by the Aircraft Fire Safety testing lab of the Federal Aeronautics Administration (FAA) technical center in Atlantic City, N.J., and was found to have superior fuselage burnthrough performance compared to current thermal and acoustic insulating materials used in aircraft. The test was performed using a standard method employed to assess materials for fuselage burnthrough protection using a controlled flame. A 20" by 36" by 3" thick specimen of the material passed a test which exposed the sample to a flame temperature exceeding 2000° F. for a minimum of 240 seconds.

Material Performance

Samples of low-density, high-loft insulation prepared in accordance with this invention were tested for thermal and acoustic properties. These samples also underwent a standard physical property assessment, which examined each sample's thickness, density, tensile strength, resistance to crushing, elongation and mullen burst strength. The samples tested correspond to the configuration of material described in Example 7, above.

Figure 6:
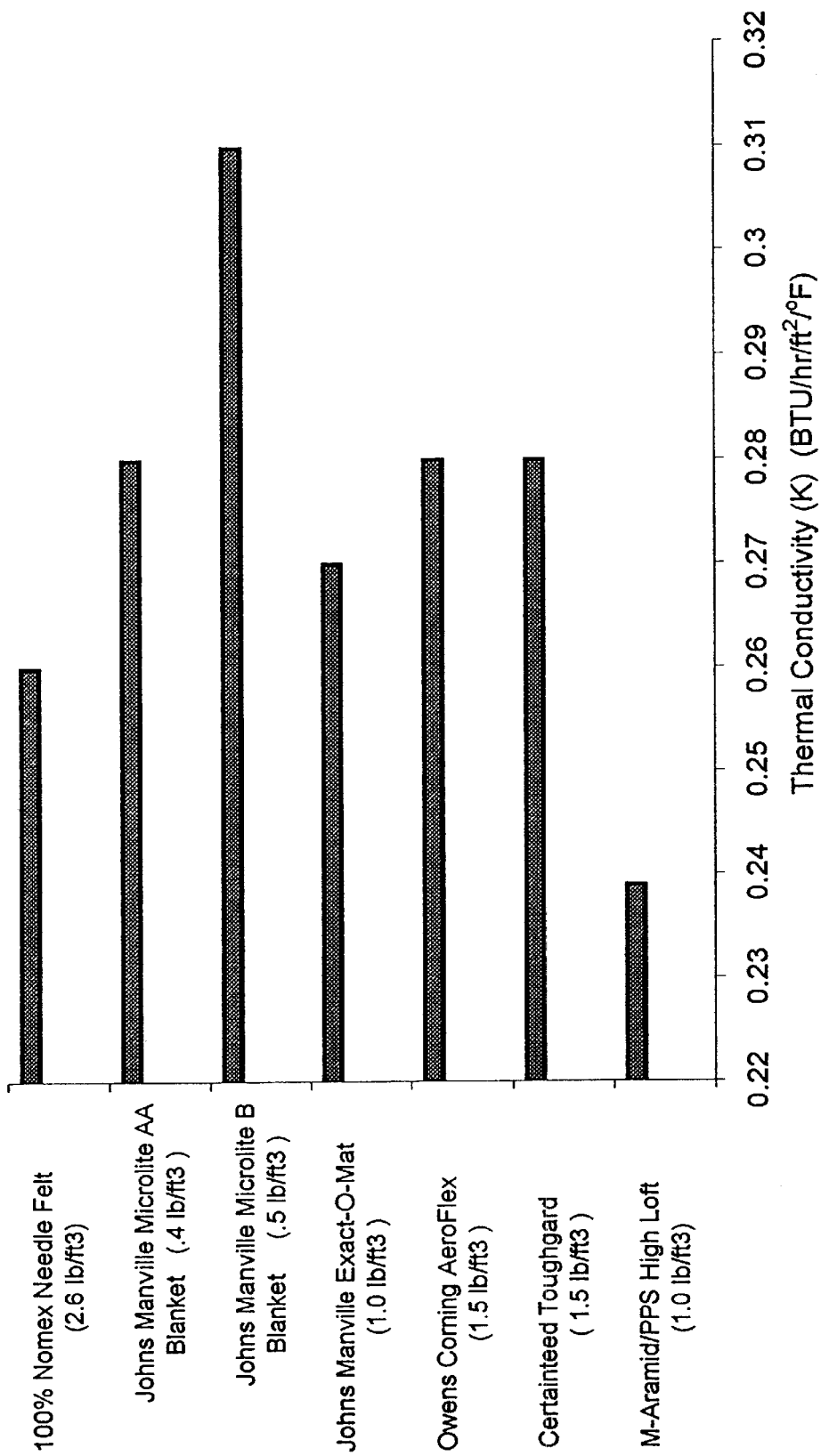
FIG. 6 compares the thermal conductivity of the present invention and other types of insulation.

Thermal testing was performed in accordance with ASTM C518—Steady State Heat Flux Measurements and Thermal Transmission Properties, using a Heat Flow Meter Apparatus (testing conducted by Holometrix-Micromet, of Bedford, Mass.). As shown in FIG. 6, which is a graph depicting the comparative thermal conductivity of different materials, the low-density m-aramid insulation showed significantly superior insulating properties when compared with conventional insulating materials of similar density and fiber diameter as well as materials used for aircraft fuselage insulation applications such as Nomex® needle felt, Johns Mansville Microlite AA® blanketing, and Johns Mansville Microlite B® blanketing.

Figure 4:
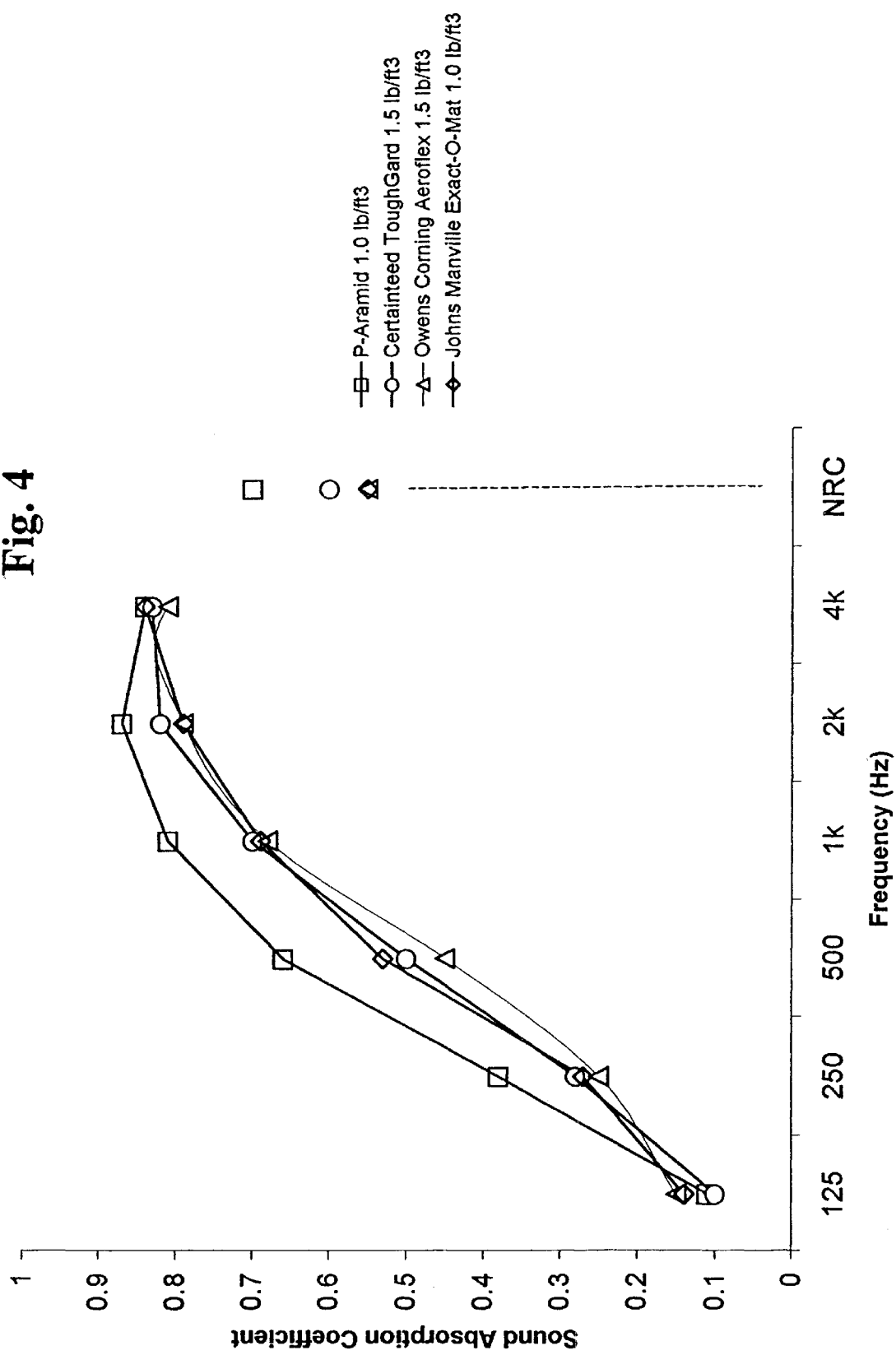
FIG. 4 compares the acoustic performance of insulation according to the present invention to that of various types of conventional insulation.
Figure 5:
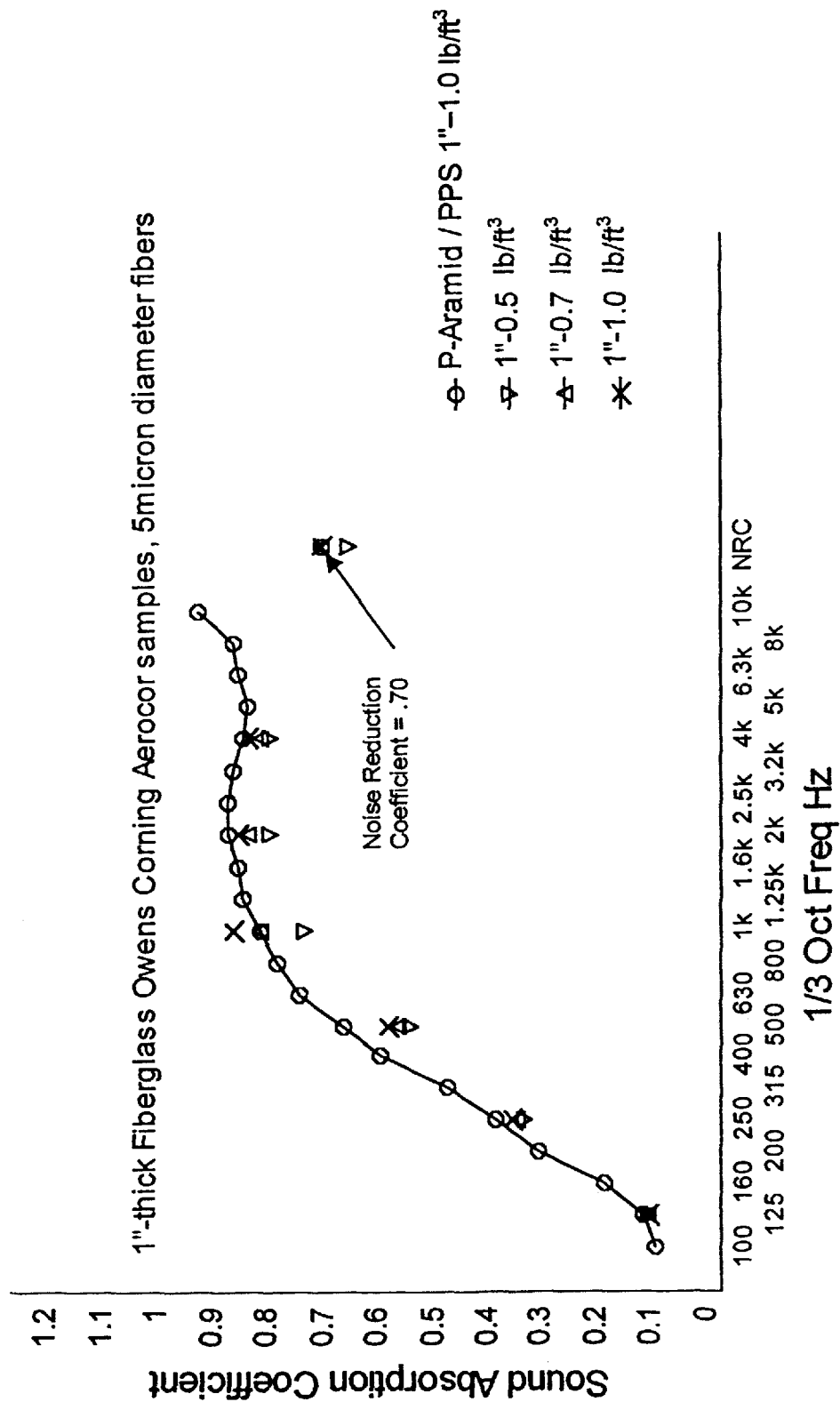
FIG. 5 compares the acoustic performance of insulation according to the present invention to that of insulation composed of smaller diameter fibers and greater pack density.

Acoustic testing was performed in accordance with ASTM C522—Airflow Resistance and ASTM C423—Sound Absorption and Sound Absorption Coefficient by Reverberation Room Method (testing conducted by Geiger & Hamme, L. L. C., Ann Arbor, Mich.). FIGS. 4 and 5 show the acoustic performance of insulation prepared in accordance with this invention. FIG. 4 shows the acoustic performance of the low density m-aramid material described in the current invention compared to the performance of similar typical fiberglass insulation. FIG. 5 shows the acoustic performance of insulation in accordance with the present invention compared with three different samples of conventional types of insulation offering similar acoustic performance (represented by ∇, Δ and ×); it should be noted that the present invention provides performance that is at par with or better than conventional material having much smaller diameter fibers. Thus, the present invention offers, on an equivalent basis, superior acoustic performance.

The average noise reduction coefficient (NRC) was measured for each material and plotted on the right side of the graph. The plot shows the superiority of the m-aramid material over fiberglass material of similar density and fiber diameter. The low density m-aramid material performance is superior to similar fiberglass materials over a wide range of frequencies and reflects a significantly better acoustic insulator.

Figure 3:
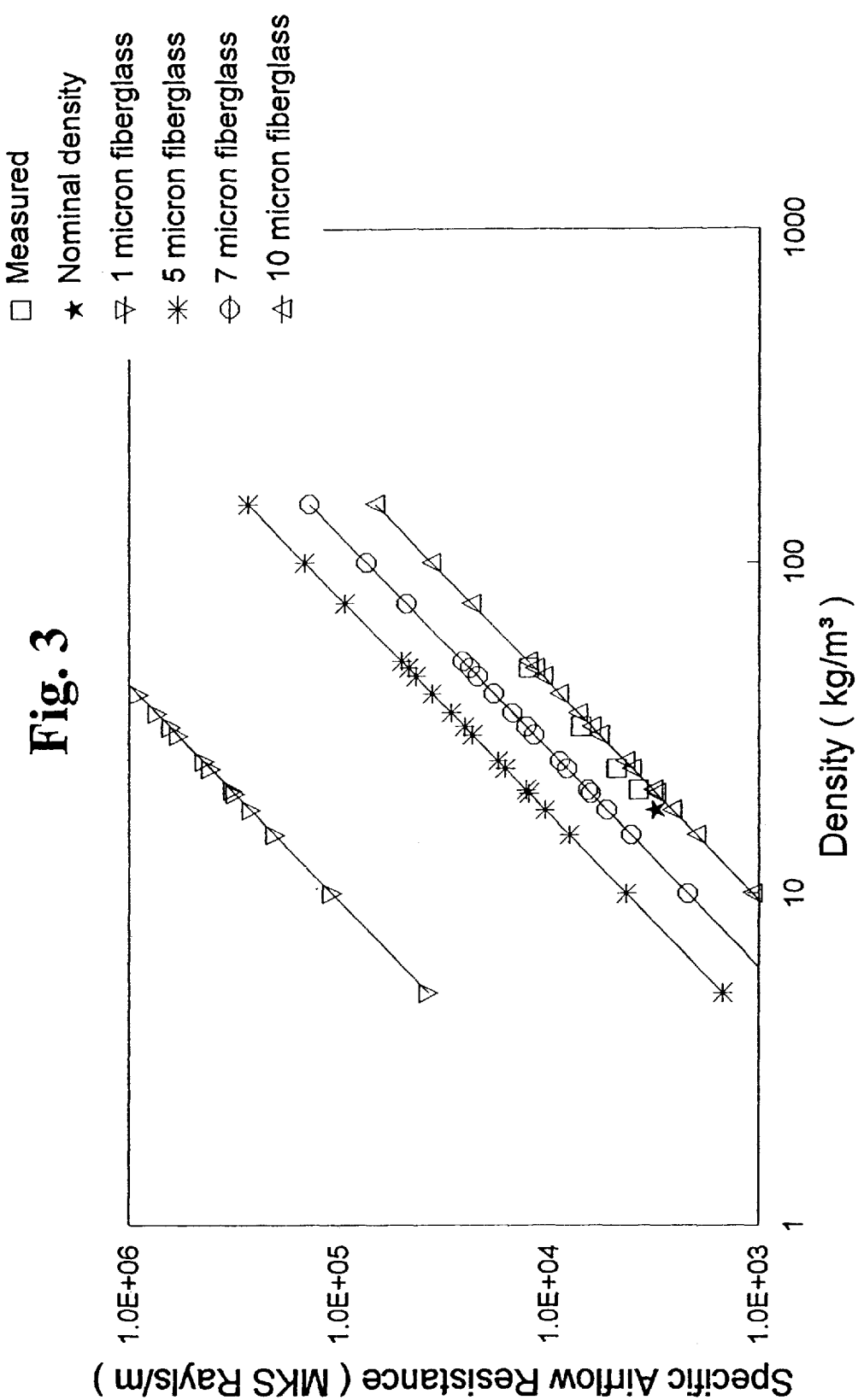
FIG. 3 compares the airflow resistance for insulation prepared in accordance with this invention to the airflow resistance of various types of conventional insulation.

FIG. 3 depicts the relationship between the logarithm of the airflow resistance and the density of insulation material prepared according to this invention, and shows that this relationship is linear for various fiber diameters. FIG. 3 also compares the airflow resistivity relative to density for different materials, including insulation prepared in accordance with this invention. It should be noted that according to FIG. 3, this invention provides material allowing airflow comparable to that of a 9-micron diameter glass pack, even though the acoustic performance data for such material, seen in FIG. 5 shows that the insulation offered acoustic insulation properties equal to that of a 5 micron diameter glass pack material. Thus, it will be appreciated that low-density high-loft insulation according to this invention offers better acoustic properties for a given airflow resistance than conventional fiberglass insulation.

In FIG. 5, the noise reduction coefficient (NRC) for the 1"–1.0 lb/ft$^3$ p-aramid/pps material according to the present invention is 0.70. The 1" thick samples of Owens Corning Aerocor fiberglass insulation having densities of 0.7 lb/ft$^3$ and 1.0 lb/ft$^3$ also had NRC's of 0.70. The Aerocor sample having a density of 0.5 lb/ft$^3$ had a somewhat smaller NRC.

The foregoing test data suggests that increasing the insulation's density, while decreasing the fibers' diameters, should improve acoustic performance. Thus, when manufacturing insulation according to this invention, one can produce insulation having specific acoustic properties, with adequate airflow to allow for the evaporation of trapped moisture, by using the appropriate materials to form the insulation.

Two different samples of insulation according to this invention and conventional fiberglass insulation were compared to illustrate this invention's superiority under loads. The samples were placed in a platen press and loads were applied at levels sufficient to fracture the structural, or load bearing fibers within the material. Table 1 shows the results of such testing, and compares both the load applied to each sample and each sample's subsequent recovery of thickness. It will be appreciated that the low-density high-loft material of this invention exhibited much greater resistance to crushing than comparable glass fibers.

TABLE 1

|  | Load (psi) | Recovery (%) |
|---|---|---|
| m-aramid/PPS (Trial #1) | 406 | 95 |
| m-aramid/PPS (Trial #2) | 1306 | 82 |
| fiberglass batting | 312 | No Recovery |

Table 2 compares the material properties of insulation prepared according to the present invention and comparable fiberglass insulation. These tests shown that the insulation of this invention is both more durable and stronger than the fiberglass insulation. The same testing procedures were used to evaluate the different samples, and the samples having similar weights, thicknesses, and densities were chosen for evaluation. A direct comparison of the test data shows that the current invention is a superior alternative to fiberglass insulation, in part because it offers the benefit of durability even after repeated handling; loading does not cause the insulation to shed particles. This is in contrast to fiberglass insulation, which, as previously noted, undergoes shattering and fragmenting of its component glass fibers when exposed to loads during installation and maintenance. That is, the installation and maintenance of conventional fiberglass insulation often involves the application of point compressive loads, which fracture and crush the glass fibers, resulting in the release of glass fragments, and degrading the material's performance through loss of resilience. In contrast, insulation according to this invention is unaffected by the application of typical point loads during installation and handing.

TABLE 2

|  | fiberglass | m-aramid/PPS | test method |
|---|---|---|---|
| oz/yd$^2$ | 12.3 | 13.7 | ASTM D3776 |
| thickness (in.) | 1.0 | 1.2 | ASTM D1777 |
| tensile strength (lbs.) | 2.3 | 23.6 | ASTM D5034 |
| Mullen burst strength (psi.) | 33 | 485 | ASTM D461 |

This invention is meant to encompass the use of a variety of high-performance materials. High-performance materials refer to materials having properties which render the resulting insulation suitable for use in extreme conditions. For example, where the insulation must be able to withstand use at high temperature, or be fire-resistant, a percentage of the non-thermoplastic fibers can be blended with fibers know for use as fire retardant, fireproof and/or ablative materials. Examples of such materials include ceramic fibers, melamines, PAN, para-aramid, polybenzimidazole and polyphenylenebenzobizoxazole. So too, where the insulation is to be used in chemically aggressive situations, such as highly acidic or basic environments, the component non-thermoplastic and thermoplastic materials can be chosen to withstand that environment.

The non-thermoplastic fibers used in this invention can range in size from approximately 3–150 microns (0.08–220 denier) with staple lengths ranging from approximately 0.5–15.0 inches ("approximately" means that sizes outside this range can be used provided they still result in the production of material having insulative properties).

The fiber diameter of the thermoplastic material used in this invention can range in size from approximately 3–150 microns (0.08–220 denier) with staple lengths of these fibers ranging from approximately 0.5–15.0 inches.

The resulting insulating material has a density of approximately 0.1–3.0 lbs/ft$^3$.

Insulation prepared in accordance with this invention can be formed into blocks or rolls suitable for later installation. If desired, the insulation could in advance of installation be cut to shape; this may be helpful where the insulation is used in a production line such as an aircraft construction line. Material prepared according to this invention could also be bonded to structures using heat sealing equipment, latch and hook technology (i.e., Velcro® fasteners) and/or ultrasonic welding devices to attach, connect or bond the material to adjacent structures or other like material. This is especially important in the installation of aircraft insulation where seam failure is an issue in the protection against fuselage burnthrough.

Another embodiment of this invention involves the addition of a fire blocking layer to the insulation. The fire blocking layer may be physically attached to the insulation by means of mechanical attachment, as in needling, thermal bonding, adhesives or any means which would result in the physical attachment of a fire blocking layer to one or both sides of the material. This fire blocking layer could be made from fire retardant or ablative materials such as polyacrylonitrile (PAN) fibers, ceramics, intumescent foams, foils or polymer films.

Alternatively, fireblocking material could be provided within the insulation itself, for example, by dispersing fireblocking material throughout the fiber blend.

Particularly desirable fireblocking results were obtained with a blend of materials composed of approximately 40% m-aramid, 20% PAN, 20% PPS and 20% pre-ceramic fibers. Preferably, such pre-ceramic fibers are fibers of $Al_2O_3$ (modified silicic acid). The silicic acid material contains approximately 95% $SiO_2$, 4.5% $Al_2O_3$, and less than 0.2% alkaline oxides, and this material is commercially available as BelCoTex® staple fiber, available from Belchem Fiber Materials GmbH, Germany. Adding this material proved to be extremely effective in protecting adjacent organic fibers and limiting flame propagation. The 20% level is described as an example that produced desirable results the level of pre-ceramic material used may be more or less depending upon the desired degree of protection. The addition of pre-ceramic fibers to the blend, as well as the addition of an attached layer of ablative or protective barrier material to the surface of the insulative material is especially desirable when designing material which will offer high temperature flame protection.

Next, methods for forming various insulation materials in accordance with this invention will be discussed.

Insulation of the type already described can be manufactured by first opening and blending fibers, carding and needling the blended fibers, heating the fibers, and then suitably finishing the produce. Each of these steps will now be discussed in detail.

Opening and Blending

This invention begins with the selection of a blend of thermoplastic and non-thermoplastic materials, and the mixing of those materials in an intimate blend. For example, 20% PPS fibers are mixed with 80% m-aramid fibers. The fibers can be blended by an opening process, which entails the mechanical agitation and/or mixing of the fibers in a stream of air. During this opening process, blending of the different fibers takes place, and the fibers become homogeneously mixed.

In a further aspect of this invention, insulation prepared in accordance with Example 7 could include 20% 2.7 denier, 1.5" staple length, PPS fibers combined with 80% 5.0 denier 3" staple length m-aramid fiber, and hereafter will be referred to as Example 9.

Another blend of fibers in accordance with Example 1 (hereafter referred to as Example 10) could be manufactured from a blend of fibers along the following lines: the blend could contain 20% 0.9 denier, 1.5" staple length PPS fiber combined with 80% 1.0 denier 3" staple length m-aramid fiber. This insulation is expected to provide a high loft fabric having thermal, acoustic and mechanical properties different from insulation made from the foregoing blend of fibers (Example 9).

Insulation made from the Example 9 blend is expected to be of lighter weight and have less compressive strength than the insulation made from the example 10 blend. Also, the insulations made from the blends of examples 9 and 10 can be expected to have differing acoustic and thermal properties.

More specifically, PPS and m-aramid fibers that could be used in this invention can range in size from approximately 0.08–220 denier having approximately 0.5–15.0 inches in staple length. These fibers could be combined in amounts ranging from between approximately 60–90% non-thermoplastic fibers and between approximately 10–40% thermoplastic fibers. The precise amount of each of the materials used can be chosen to provide the finished insulation with desired properties, as can be seen in the two previous examples.

It will be appreciated that the ability to tailor the finished insulation material for specific mechanical, acoustic and or thermal applications through the suitable selection of the non-thermoplastic and thermoplastic fibers combined in the blend provides great flexibility for the material designer. This is just one of several opportunities that this invention gives the material designer to control the properties of the insulation that is produced.

Carding and Needling

The blended fibers are further opened and oriented in a carding process. This process involves forming the staple fibers into a singular web held together by the mechanical interlocking of fibers. Typically, the web utilized in the process weighs between approximately 0.3–15 oz/yd². A web weight less than 0.3 oz/yd² proves to be difficult to handle due to the lack of fiber entanglement, and likewise, a web weight heavier than 15 oz/yd² creates a material with a density beyond that of the proposed invention. For a description of the carding process, see U.S. Pat. No. 3,983,273, the contents of which are incorporated by reference herein.

While in the carding machine, the web of fibers is subjected to a cross-lapping procedure and is then transferred onto a lower apron (floor apron) moving perpendicular to the web of fibers exiting the carding operation. If desired, multiple layers of the lightweight web can be laid one atop another by means of a reciprocating apron. If the floor and reciprocating aprons have different speeds, different numbers of web layers can be produced, enabling the desired batt (multiple webs) weight to be achieved. The batt fiber orientation can be adjusted in the longitudinal or transverse directions to increase or decrease the in-plane strength properties of the finished material.

The carded web and subsequent layers forming the batting can then be consolidated through a low-density needling procedure, which mechanically interlocks the fibers. This low-density needling procedure may also be utilized as a means of attaching other fibrous layers to the semi-finished or finished material. For example, a fire blocking or ablative layer may be attached to the fibrous batting at this stage in preparation for further finishing procedures. An example of the needling process can be found in U.S. Pat. No. 3,117,359, the contents of which are incorporated by reference herein. The needling process uses barbed needles, which are forced through the material to mechanically entangle the fibrous layers. This step in the process is accomplished primarily as a way of allowing the semi-finished material to be handled. This step of needling may, however, be omitted if in-line curing of the batting is accomplished.

The inventor has performed this interlocking procedure in connection with the present invention using a small pretacking needle loom having a density of 32 needles per foot, as measured across the width of the board. The needling procedure was found to increase the density of the batting from approximately 0.1 lbs/ft$^3$ to approximately 0.5 lbs/ft$^3$.

In this aspect of the invention, two factors are thought to affect the density of the final material. The first factor involves the type of needle used in the needling operation, and the second factor involves the number of web layers which are provided.

It is envisioned that the needles which can be used in this invention include needles of the types commonly employed in the nonwoven textile industry to produce commercial grade fabrics for use as insulation and/or padding. Examples of such needles can be found in U.S. Pat. Nos. 3,307,238, 3,844,004, 3,762,004, 3,464,097, 3,641,636, 4,309,800 and 4,131,978, the contents of which are incorporated by reference herein. Thus, the needles that can be used in this invention may have barb configurations ranging from "non-aggressive" to "aggressive". The non-aggressive barb configuration has a low degree of kick up, and so is characterized by a shallow barb gullet. This type of needle increases loft and produces a low density product because there is relatively little mechanical interlocking. The aggressive barb configuration has a high degree of "kick up", and is typically characterized by a deep barb gullet. Such needles increase consolidation and mechanical interlocking of the fibers.

The density of the batt also can be controlled by regulating the number and relative weight of each web layer as it exits the carding operation. By varying the feed rate of the fibers into the carding operation, the total quantity of fiber in the web can be adjusted. For example, if the crosslapping rate is held constant, and the web weight increases, the final batt density will be increased. Conversely, if the crosslapping rate is held constant and the web weight decreases, the final batt density will decrease.

Heating

The batting is consolidated and bound by means of a heating process. This process serves to join at least some of the interstices between neighboring non-thermoplastic fibers. In this step the material is heated to a temperature at least equal to and preferably exceeding slightly the melting temperature of the thermoplastic component. The material is held at this temperature for a period of time sufficient to allow at least some of the thermoplastic material to melt. Melting of the thermoplastic material results in the formation of globules of thermoplastic material, and at least some of those globules collect at the intersections and crossing points of the non-thermoplastic fibers.

It has been found that when the thermoplastic material includes PPS fibers, those fibers melt and take on a globular form, which causes some densification of the resulting material. This can be seen in FIG. 7, a photograph of m-aramid/PPS blended batting following heating. Typically, such increased densification can be on the order of 10–15% by volume. The sample shown in FIG. 7 was prepared using the procedures described in the following paragraphs.

Production scale quantities of insulation have been produced using a tenter frame dryer, measuring 280 cm wide and 30 meters in length (dryer manufactured by the Monsfort Company, St. Stefan, Austria). The material was prepared as described in Example 7 above, specifically, a blend of 20% 1.2 denier 1.5" staple length PPS fibers and 80% 2.0 denier 3.0", staple length m-aramid fibers, formed into a thick lofty batting. Heating of the uncured batting was controlled as the batting passed through eleven separate heating zones, the first seven of which were adjusted to maintain a temperature of 575° F.+/−10° F. The drive chain speed was set at 1.5 meters per minute, and the unheated batting was placed on a supporting fabric attached to drive pins along the selvedge and processed through the heating stage. The last four heating zones were adjusted to a temperature of 180° F. causing material to cool rapidly. This process cooled the material well below the glass transition temperature of thermoplastic PPS to promote solidification in the glassy or amorphous phase. The cooled thermoplastic material, which coalesced into globules, held the non-thermoplastic fibers together, and so served as a semi-elastic binder forming a structural lattice within the aramid fibers. The thermoplastic PPS binder, when used in conjunction with high modulus m-aramid structural fibers, results in insulation having high resiliency, and other superior physical properties.

Heating also may be accomplished using other known methods that would tend to melt the thermoplastic fibers. One example of an alternative heating method would be the use of radiant heaters. Such heaters can be placed in close proximity to the top and bottom surface as the uncured material is passed between them on a metallic or fabric conveyor belt. Adjustment of the upper and lower heaters in conjunction with the belt speed will allow uniform heating of the fabric.

Alternatively, other heating methods may involve the use of microwave radiation, steam or similar methods to melt the thermoplastic binder fibers.

Finishing

In some situations, it may be desirable to provide insulation with a degree of water or oil repellency. This can be accomplished by applying a finishing treatment to the insulation. Typically, such finishes are dispersed polymer emulsions that have been applied by immersing the insulation in a water- or solvent-based emulsion bath. A padding process to remove excess treatment and a subsequent drying step immediately follow. Production scale quantities of the low density m-aramid insulating material were treated for oil and water repellence, following the procedure described above, using a PTFE (polytetrafluoroethylene)polymer emulsion provided by the du Pont company of Newark, Del.

Drying of the material was accomplished using the same tenter frame dryer just described. This was done using a supporting fabric through the drying process. A temperature setting of 425° F.+/−10° F. was used for the entire drying process, and the drive chain speed was set to 2.0 meters per minute.

Treatment finishes also could be applied using foam or spray to coat the material, and this would be followed by a drying step. The drying temperature should be sufficient to drive off excess moisture and or solvent within the material, without damaging the material or the applied finish.

Such finish coatings applied to the fiber mix after the cooling step could serve to render the resulting insulation less water absorbent, more fire-resistant, more soil resistant, more chemical resistant, more mildew resistant, more insect resistant and/or more radiation resistant. Multiple coatings, or coatings improving more than one of these properties, also could be applied.

If desired, the finish coating could include a material which develops a foam layer at an elevated temperature and, through oxidation, develops an ablative charring layer.

Other variations and modifications of this invention will be apparent to those skilled in this art after careful study of this application. This invention is not to be limited except as set forth in the following claims.

What I claim is:

1. A method of manufacturing an insulating material, comprising the steps of:
   providing a plurality of fibers comprising a non-thermoplastic material;
   providing a thermoplastic material;
   mixing the non-thermoplastic material and the thermoplastic material together to obtain a fiber mix;
   heating the fiber mix that that at least some of the thermoplastic material melts and form globules which at least partially surround and thereby link portions of said non-thermoplastic fibers;
   cooling the fiber mix so that the melted thermoplastic material globules form nodes which hold the non-thermoplastic fibers together;
   wherein said insulating material has a density of between approximately 0.1 to 3.0 lbs/ft$^3$.

2. A method as in claim 1, wherein in the heating step the fiber mix is heated to a temperature of at least 538° F.

3. A method as in claim 1, further comprising the step of consolidating the fiber mix.

4. A method as in claim 3, wherein the consolidating step comprises a step of needling the fiber mix.

5. A method as in claim 1, further comprising the step of attaching a fire blocking layer to the insulating material.

6. A method as in claim 1, wherein the fireblocking layer includes at least one of polyacrylonitrile, ceramic, foil and polymer film.

7. A method as in claim 1, further comprising the step of applying a finish coating to the fiber mix after the cooling step.

8. A method as in claim 7, wherein the finish coating renders the resulting insulation at least one of less water absorbent, more fire-resistant, more soil resistant, more chemical resistant, more mildew resistant, more insect resistant and more radiation resistant.

9. A method as in claim 7, wherein the finish coating includes a material which develops a foam layer at an elevated temperature and, through oxidation, develops an ablative charring layer.

10. A method as in claim 1, wherein the fibers of the non-thermoplastic material have a fineness of between approximately 0.08 and 220 deniers.

11. A method as in claim 1, wherein the thermoplastic material comprises a plurality of fibers each having a fineness of between approximately 0.08 and 220 deniers.

* * * * *